United States Patent
Venter et al.

(10) Patent No.: US 10,095,982 B1
(45) Date of Patent: *Oct. 9, 2018

(54) SYSTEM AND METHOD FOR WELL TRACE ANALYSIS

(71) Applicant: DATAINFOCOM USA, INC., Austin, TX (US)

(72) Inventors: Frederick Johannes Venter, Driftwood, TX (US); Atanu Basu, Austin, TX (US)

(73) Assignee: DATAINFOCOM USA, INC., Austin, TX (US)

( * ) Notice: Subject to any disclaimer, the term of this patent is extended or adjusted under 35 U.S.C. 154(b) by 839 days.

This patent is subject to a terminal disclaimer.

(21) Appl. No.: 14/500,986

(22) Filed: Sep. 29, 2014

Related U.S. Application Data

(60) Provisional application No. 61/903,812, filed on Nov. 13, 2013.

(51) Int. Cl.
*G06N 99/00* (2010.01)
*G06N 7/00* (2006.01)
*G06F 17/30* (2006.01)

(52) U.S. Cl.
CPC ..... *G06N 99/005* (2013.01); *G06F 17/30958* (2013.01); *G06N 7/00* (2013.01)

(58) Field of Classification Search
CPC .. G06N 99/005; G06N 7/00; G06F 17/30958; G06T 7/194; G06T 7/13; G06K 9/4642; G06K 9/4647; G06K 9/6212; G06K 9/00476
USPC ...................................................... 382/225
See application file for complete search history.

(56) References Cited

U.S. PATENT DOCUMENTS

| | | | |
|---|---|---|---|
| 5,978,520 A * | 11/1999 | Maruyama | G06K 9/00476 382/113 |
| 6,876,988 B2 | 4/2005 | Helsper et al. | |
| 6,917,928 B1 | 7/2005 | Pellinat | |
| 6,996,268 B2 * | 2/2006 | Megiddo | G06F 17/30256 382/159 |
| 7,373,633 B2 | 5/2008 | Kraiss et al. | |
| 7,979,380 B2 | 7/2011 | Moyne et al. | |
| 8,200,527 B1 | 6/2012 | Thompson et al. | |
| 8,209,218 B1 | 6/2012 | Basu et al. | |
| 8,209,275 B2 | 6/2012 | Tsui et al. | |
| 8,364,519 B1 | 1/2013 | Basu et al. | |
| 8,738,425 B1 | 5/2014 | Basu et al. | |
| 2001/0034628 A1 | 10/2001 | Eder | |
| 2002/0006192 A1 | 1/2002 | Bengtson et al. | |
| 2002/0049621 A1 | 4/2002 | Bruce | |
| 2002/0049687 A1 | 4/2002 | Helsper et al. | |

(Continued)

OTHER PUBLICATIONS

Yang, E.L. "PCTR: An improved approach to digitizing well-logging parameter graph." In Machine Learning and Cybernetics, 2009 International Conference on, vol. 3, pp. 1799-1804. IEEE, 2009.*

(Continued)

*Primary Examiner* — Stanley K. Hill

(57) ABSTRACT

A method of digitizing a well log includes identifying automatically with a computational circuitry a legend and at least one graph of the well log; determining based on a machine learning a parameter of the at least one graph indicated in the legend; and digitizing the at least one graph based on the parameter.

20 Claims, 7 Drawing Sheets

(56) References Cited

U.S. PATENT DOCUMENTS

| | | |
|---|---|---|
| 2003/0177060 A1 | 9/2003 | Seagraves |
| 2004/0068429 A1 | 4/2004 | MacDonald |
| 2004/0068431 A1 | 4/2004 | Smith et al. |
| 2004/0148047 A1 | 7/2004 | Dismukes et al. |
| 2005/0004834 A1 | 1/2005 | Smith |
| 2006/0010164 A1 | 1/2006 | Netz et al. |
| 2006/0101017 A1 | 5/2006 | Eder |
| 2006/0229921 A1 | 10/2006 | Colbeck |
| 2006/0242033 A1 | 10/2006 | Corbett |
| 2006/0242035 A1 | 10/2006 | Corbett et al. |
| 2007/0106593 A1 | 5/2007 | Lin |
| 2007/0129893 A1 | 6/2007 | McColl et al. |
| 2007/0150324 A1 | 6/2007 | Makita et al. |
| 2008/0004922 A1 | 1/2008 | Eder |
| 2008/0027769 A1 | 1/2008 | Eder |
| 2008/0104104 A1 | 5/2008 | Nolan et al. |
| 2008/0140623 A1 | 6/2008 | Tien et al. |
| 2008/0183786 A1 | 7/2008 | Shimizu |
| 2008/0195440 A1 | 8/2008 | Bagchi et al. |
| 2008/0201397 A1 | 8/2008 | Peng et al. |
| 2008/0243912 A1 | 10/2008 | Azvine et al. |
| 2009/0064025 A1 | 3/2009 | Christ et al. |
| 2009/0138334 A1 | 5/2009 | Henby et al. |
| 2009/0319931 A1 | 5/2009 | Hutchings et al. |
| 2009/0171879 A1 | 7/2009 | Bullen et al. |
| 2009/0217183 A1 | 8/2009 | Moyne et al. |
| 2010/0077077 A1 | 3/2010 | Devitt |
| 2010/0114899 A1 | 5/2010 | Guha |
| 2010/0274637 A1 | 10/2010 | Li et al. |
| 2010/0332439 A1 | 12/2010 | Adachi |
| 2011/0071867 A1 | 3/2011 | Chen et al. |
| 2011/0213644 A1 | 9/2011 | Phene |
| 2012/0215628 A1* | 8/2012 | Williams ............... G06Q 30/02 705/14.49 |

OTHER PUBLICATIONS

Brown et al., "LOGDIGI Manual", 1987, Logic Group, revised 1991.*

Lai, Ming, Longzhuang Li, and Yonghuai Liu. "A Three-Step Approach to Detect and Remove Grid Lines in Well-Logging Digitization." In Computer Graphics and Imaging, pp. 167-170. 2005.*

Li, Chunsheng et al.; "An Agent-Based Curve-Digitizing System for Well-Logging Data Management"; 2003; IEEE; Proceedings of the International Conference on Information Technology: Computers and Communications; 5 pages (Year: 2003).*

Li, Chunsheng et al.; "An Approach to Digitizing and Managing Well-Logging Parameter Graphs with Agent-Based Perspective"; 2003; Proceedings of the IEEE/WIC International Conference on Intelligent Agent Technology; 7 pages (Year: 2003).*

Zou, Changchun et al.; An Effective Approach for Skew Detection and Correction of Geophysical Log Image Using Hough Transform and a Priori Knowledge; 2008; IEEE; ICSP2008 Proceedings; pp. 1157-1160. (Year: 2008).*

"Altaworks Selected by Industry Influencers to Demonstrate at DEMO 2002 Conference"; Business/Technology Editors; Business Wire; New York; Jan. 16, 2002; p. 1; Proquest.

"Fonterra Canpac Deploys Pavilion's Production Performance Management Solution: Fast Moving Consumer Goods Manufacturer Improves Operational Performance and Reduces Waste"; Business Wire; New York; May 23, 2006; p. 1; Proquest.

"Performance-Measurement & Small to Mid-sized Call Center Solutions"; Call Center Solutions; Mar. 1999; 17, 9; ProQuest Central; p. 22.

"Predictive Analysis with SQL Server 2008"; White Paper; Microsoft SQL Server 2008 R2; Nov. 2007.

Bauer; "Predictive Analytics: Data Mining with a Twist"; DM Review 15.12; Dec. 2005; p. 76.

Bauer; "Predictive Analytics: The Next Wave in KPI's"; DM Review; Nov. 2005.

Cheisa et al; "How do measurement objectives influence the R&D performancee measurement system design:"; Management Research News; 30(3); pp. 182-202; doi:10.1108/01409170710733269.

Colias; "New Statistical Tools for Key Driver Analysis"; Decision Analyst; 2007.

Fair Isaac Corp.; Decision Management Tools—Xpress OptiMIzer; Product Sheet; 2008; 2 Pgs.

Fair Isaac Corporation; "Predictive Analytics: Custom Insurance Analytics"; Product Sheet; 2008; 2 pages.

Frangopol et al.; "Probabilitic Performance Prediction of Deteriorating Structures Under Different Maintenance Strategies: Condition, Safety and Cost"; Apr. 2004.

Holland; "Achieving a step change in contact centre performance: Exploiting data to make better decisions and take effective action"; Journal of Targeting, Measurement and Analysis for Marketing, vol. 12, 2, pp. 103-113.

Keeley; "Root Cause Analysis Research Corner Cause and Effect"; Call Center Magazine; Mar. 2005.

Lawson et al; "Socrecards and dashboards-partners in performance"; CMA Management; Dec./Jan. 2007.

Loucks; "Model Sensitivity and Uncertainty Analysis"; Water Resources Planning and Management; UNESCO; 2005; http://ecommons.library.cornell.edu/bitstream/1813/2804/12/09_chapter09.pdf.

Marr; "Measuring and managing intangible value drivers"; Business Strategy Series; 8(3); 2007; pp. 172-178.

Palfreyman;"Performance Indicators and Reporting: Some practical guidelines"; 1998; Charter. 69 (4), pp. 85-86.

SAS Institute Inc., "How to Compete on Analytics: The Analyitical Center for Excellence"; White Paper; 2008; 18 pages.

SAS Institute Inc., Ngenera Corporation, and Intel; "Sucessful Automating Decisions with Business Analytics: How to Identify High-Value Opportunities for Embedding Analytics into Your Business Processes"; White Paper; 2008; 22 pages.

SAS Institute Inc.; Enhancing Sales and Operations Planning with Forecasting; White Paper; 2008; 14 pages.

SAS Institute: "Data Driven Decision Making: Analyzing Your Data to Improve Student Learning"; White Paper; 2008; 19 pages.

SAS Institute; "Data Management for Risk: The Importance of Data for Effective Risk Management"; White Paper; 2009; 11 pages.

SAS Institute; "The SAS Enterprise Intelligence Platform: SAS Business Intelligence; Enabling BI Consolidation and Standardization Without Comprises"; White Paper; 2008; 13 pages.

SPSS Inc.; Clementine® 12.0 Specifications; "Achieve Better Insight and Prediction with Data Mining"; Product Specificiations; 2008; 6 pages.

SPSS Inc.; "Get More Out of Your Analyitical Investment"; Advertisement; 2008; 2 pages.

Wen et al.; "Utilizing the Balanced Scorecard for Performance Measurement of Knowledge Management"; Journal of Accounting, Finance & Management Strategy, 3(2), pp. 39-58.

* cited by examiner

SYSTEM AND METHOD FOR WELL TRACE ANALYSIS

CROSS REFERENCE TO RELATED APPLICATION

This application claims benefit of U.S. Provisional Patent Application No. 61/903,812, filed on 13 Nov. 2013 and having the same title, which is incorporated herein by reference.

FIELD OF THE DISCLOSURE

This disclosure, in general, relates to systems and methods for analyzing well traces of well logs.

BACKGROUND

Wells are drilled for variety of reasons including production of an underground resource, generating or disposal of heat, or for waste disposal. For example, wells may be drilled to access stratigraphic structures to produce water, oil, or hydrocarbon gas. In another example, wells are drilled into salt containing structures for use in liquid extraction of salt. In a further example, wells can be used to dispose of liquid waste. In addition, wells can be utilized for capturing geothermal energy or for disposing waste heat from cooling applications.

In each case, wells are generally drilled through stratigraphic layers in rock formations. Each stratigraphic structure has different properties, such as density, porosity, permeability, rock type, hardness, salinity, or moisture content, among others. In addition, some of the stratigraphic structures can include liquids or gases, such as oil or hydrocarbon gases.

To characterize the stratigraphic structures, well logging techniques have been developed. In particular, well logging techniques have been under development since the 1920s. As such, many well logging techniques were developed long before the availability of portable computers and compact data storage. Early well logs include graphs printed on paper.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Recent advances in drilling and production techniques have led to renewed interest in older production structures. However, well log data associated with older wells drilled into such production structures are stored on printed tape well logs showing the well log in a graph format often on physical paper. Converting such well logs into paired data (e.g., data associating a depth or length with a digital value of a log readout) using conventional techniques has proven expensive and unreliable. The techniques described herein provide digitized trace data with improved reliability, greater granularity, and reduced cost.

Figure 1:
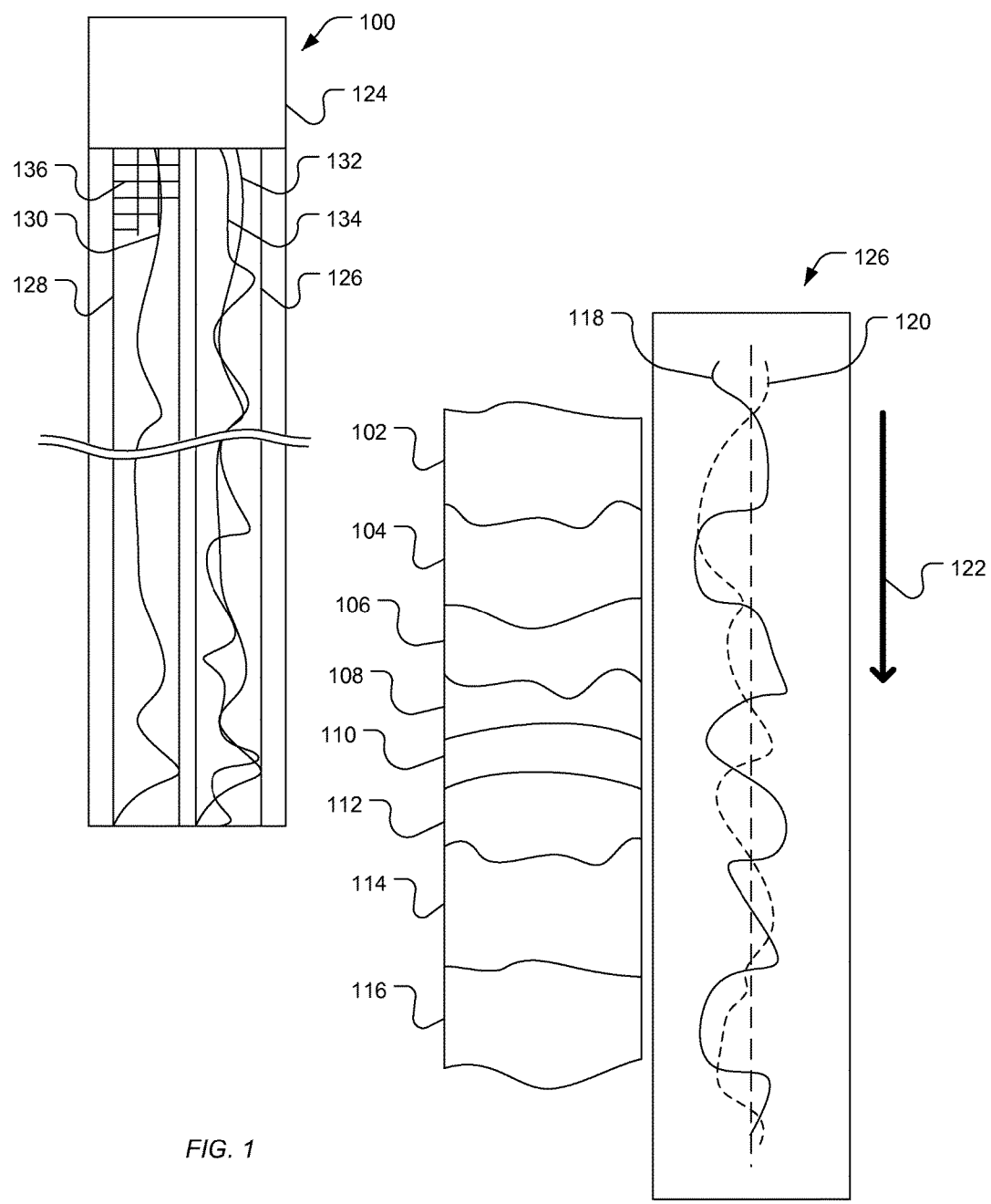
FIG. 1 includes an illustration of an exemplary well log associated with stratigraphic structures.

As illustrated in FIG. 1, a well log 100 includes a legend 124 and one or more graphs (e.g., graphs 126 or 128). The legend 124 can include information printed in alphanumeric symbols, barcoded symbols, another special representation, or a combination thereof. The information can include data associated with identification of a well, the types of testing represented by the graphs (e.g., graphs 126 or 128), parameters associated with the graphs (e.g., graphs 126 or 128), a date, a time, a starting depth, geographical formation identifiers, or a combination thereof. Regarding the one or more graphs (e.g., graphs 126 or 128), the legend 124 can include information such as a starting depth, a value range associated with the individual graphs, details about the grid dimensions, other parameters associated with the testing technique, or any combination thereof.

The graphs 126 or 128 can include one or more traces. Each trace can be associated with measurements using different testing techniques or values calculated from different testing data. As illustrated, the graph 128 includes a single trace 130. Each graph can include one or more traces. For example, graph 126 includes two traces 132 or 134. In addition, each graph can include a grid providing a reference for determining a domain and range pair for each data point. While the grid 136 is illustrated for part of the graph 128, the grid can extend throughout each graph 126 or 128 and can have different spacings for each graph. In particular, each grid can define a cell based on the spacing of grid lines along the domain and the spacing of grid lines along the range of the graph. Such grid line spacings or cell dimensions can be provided within the legend 124. In another example, a user may provide the system with the grid cell dimensions.

In particular, a graph 126 includes a graphical depiction of a measured value 118 relative to distance or depth 122. The measured values 118 vary in accord with properties of stratigraphic structures, such as stratigraphic structures 102, 104, 106, 108, 110, 112, 114, or 116, passed by a logging tool when creating a well log. The measured values 118 can be derived from measures of resistivity, impedance, acoustic impedance, gamma ray or neutron radiation, spontaneous potential differences, caliper measurements, nuclear magnetic resonance, or a combination thereof, among others.

A graph (e.g., the graph 126) can include more than one graphed value, such as a second value 120 plotted relative to distance or depth 122. The second value 120 can be graphed to overlap the first measured value 118 or can be included in a separate adjacent graph. While only two graphed values 118 or 120 are illustrated, a well log can include more than one graphed value, such as two values, three values, four values or more.

As such, in a printed well log, the data is presented in a graph image. Such data is to be contrasted with digitally stored paired data in which a value is stored as a digital value associated with a depth or distance. Printed graphical well logs can be scanned into a system and can be processed to digitize the graphs into paired digital data.

Figure 2:
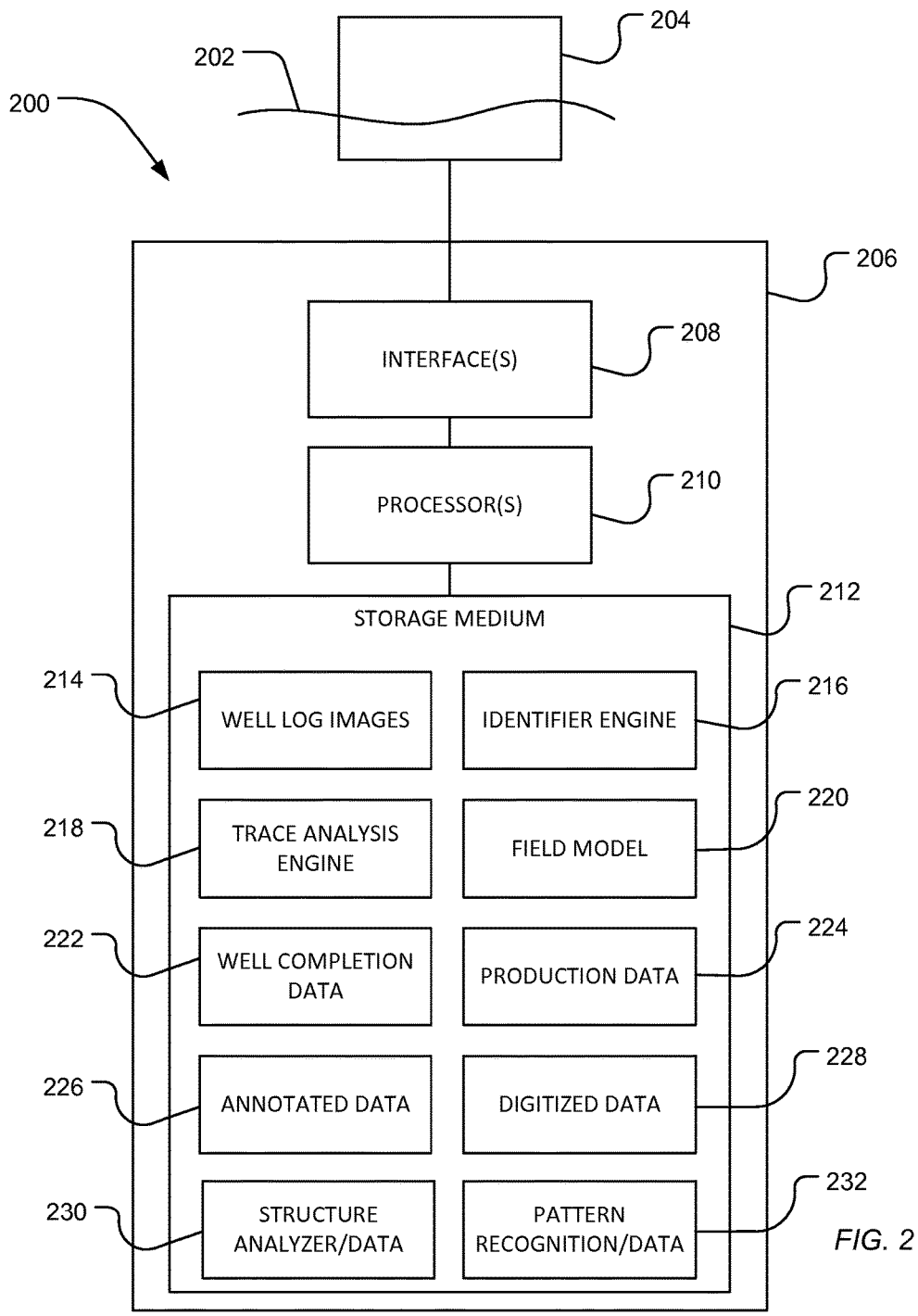
FIG. 2 includes an illustration of exemplary well log analysis system.

As illustrated in FIG. 2, a system 200 includes a scanner 204 and a computational system 206. The printed well log 202 can be scanned by the scanner 204 and provided to the computational system 206 as a raster image or in another image format via the interfaces 208. The scanner 204 can use optical technologies that use one or more of various wavelengths to enhance imaging of the well log. Such wavelengths include infrared, visible spectrum, ultraviolet wavelengths, or a combination thereof.

The scanner 204 communicates with the computational system 206 through interfaces 208. The interfaces 208 can be parallel, serial, or other interfaces, or a combination thereof. The computational system 206 can further include network interfaces, user interfaces, printer interfaces, or various other interfaces. The computational system 206 also includes one or more processors 210. Such processors 210 can be in communication with the interfaces 208 and storage medium or media 212. The storage medium 212 can include non-transitory medium for storing instructions and data. Alternatively, the storage medium 212 is separated into different physical devices. While the computational system 206 is illustrated as a single unit, one or more of the components can be separated into different housings or can communicate with other components within the system by a network, such as a local area network, wide-area network, a global network, or a combination thereof.

The storage medium or media 212 can include well log images 214. In particular, such well log images are stored in an image format in contrast to paired digital data. Exemplary image formats include bitmap, GIF, JPEG, MPEG, PNG, or PDF, among others, or a combination thereof. The physical well logs 202 can be scanned by the scanner 204 and processed through the interfaces 208 and processor 210 to be stored in an image format as well log images 214.

In a further example, the storage medium 212 can further include an identifier engine 216 to identify regions within a well log image and ascertain parameters associated with the graphs of the well log image. In particular, the identifier engine 216 can identify a legend region and one or more graph regions within the well log image. Further, the identifier engine 216 can determine parameters associated with one or more graphs. For example, the identifier engine 216 can ascertain a starting depth of the domain of the one or more graphs, the range of values represented by the one or more graphs, one or more cell dimensions, other parameters associated with the testing technique represented in the graphs, or any combination thereof. In further example, the identifier engine 216 can determine an identity of the well, the identity of the geographical structure associated with the well log, location of the well, or any combination thereof.

In a particular example, the identifier engine 216 is developed through machine learning to automatically process a well log image with limited or no user interaction. The identifier engine 216 can further have access to optical character recognition and other associated components.

The storage medium 212 can also include a trace analysis engine 218. For example, the trace analysis engine 218 can analyze well traces in graph regions identified by the identifier engine 216. In an example, the trace analysis engine 218 can assign tile locations within a graph, identified grid locations within each tile location, align adjacent tiles based on the located grids, identify contours within the graph and provide digital value pairs including a range value at domain locations along the contour. As such, digitized data can be determined from each of the graphs within the well log image, and such digitized data 228 can be stored within storage medium 212. While the functionality of the identifier engine 216 and the trace analysis engine 218 are depicted as being two separate components, the functionality of each of the engines can be combined into a single component or can be separated into multiple components that provide similar functionality.

The storage media or medium 212 can include instructions for pattern recognition and stored pattern data 232. Pattern recognition can be performed on the digitized data 228.

Such pattern data 232 derived by pattern recognition can be processed using a structure analyzer 230 to determine stratigraphic structured data. Stratigraphic structure data can include structure demarcations, material type, parameters such as porosity, density, or a measure of fracturing, the presence and type of fluid, or a combination thereof, among others. Such stratigraphic structured data 230 can be stored in the storage medium 212.

Using the stratigraphic structured data 230, a field model 220 can be developed. The structure analyzer 230 or the field model 220 can be used to project production data or suggest well related parameters such as projected production values or suggested well completion parameters. In particular, the structure analyzer 230 can be trained with well completion data 222, historical production data 224, annotated data 226, along with pattern data 232. For example, the structure analyzer 230 can be trained with annotated data 226 and pattern data 232 to identify rock properties or the presence and type of fluid within a stratigraphic structure. In an example, a structure analyzer 230 trained with pattern data 232, well completion data 222, and annotated data 226 can suggest well completion parameters. Exemplary well completion data includes drilling techniques, perforation types, number of perforation, number of boreholes, well treatment parameters such as hot oil treatment or fracturing treatment parameters. In a further example, the structure analyzer 230 can be trained with production data 224 and can project production values. Production data 224 can include historical production data, or oil, water or gas production maximums, average production values, or a combination thereof.

Figure 3:
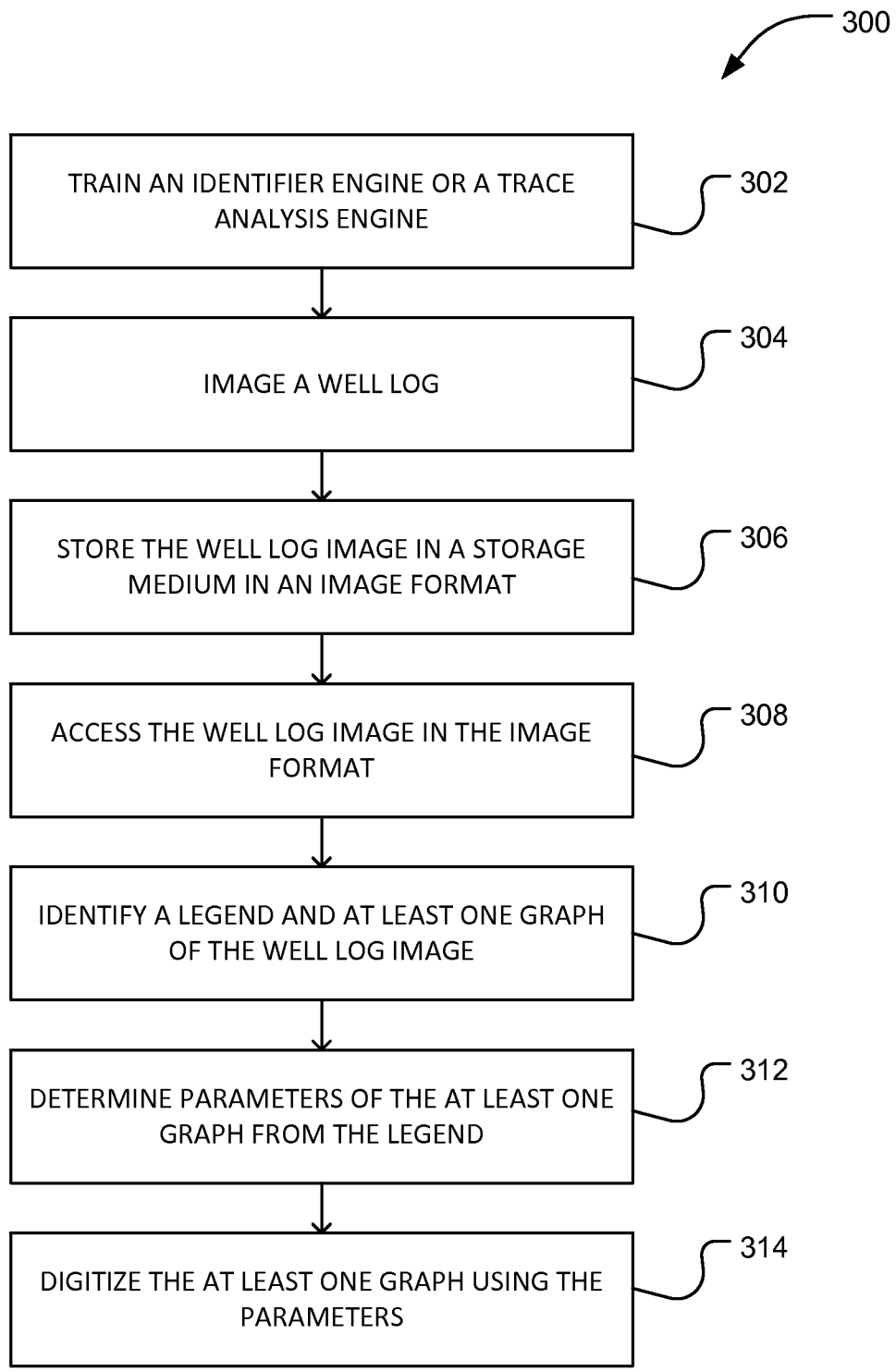
FIG. 3 and FIG. 4 include block flow diagrams illustrating exemplary methods for well log analysis.

FIG. 3 illustrates an exemplary method 300 for digitizing a trace of a well log. As illustrated at 302, an identifier engine and a trace analysis engine can be trained. For example, annotated well logs can be provided to the identifier engine and the trace analysis engine to train the engines. In particular, the identifier engine can be trained to identify the regions associated with the legend and one or more graphs. The identifier engine (e.g., engine 216 of FIG. 2) can further be trained to obtain from the legend information associated with the one or more graphs. For example, the identifier engine can be trained to identify starting domain or depth associated with the one or more graphs, a range of values associated with the graph, grid cell dimensions, or any combination thereof. The trace analysis engine (e.g., trace analysis engine 218 of FIG. 2) can be trained to digitize the trace given the parameters determined by the identifier engine. In particular, the trace analysis engine can be trained to locate grids along a graph, align the grids, find a contour of a trace associated with the test results, and digitize the contour to provide paired data including a range value and associated domain value.

As illustrated at 304, a well log is imaged to provide raster images from scans and faxes. Optionally, the well log can be imaged using more than one imaging technique at one or more wavelengths. The well log images can be stored in a non-transitory storage medium in an image format, as illustrated at 306. The image format can include bitmap, GIF, JPEG, MPEG, PNG, or PDF, among others, or combination thereof. The non-transitory storage medium can include magnetic storage medium, optical storage medium, solid-state storage medium, or various other forms of RAM or ROM, or combination thereof.

A well log image in the image format can be accessed from the storage medium, as illustrated at 308, and provided for identification of the legend and graphs, as illustrated at 310. Optionally, the well log image can be processed to filter noise or clean the image.

As illustrated at 310, a legend and at least one graph can be identified within the well log image. In an example, an identifier engine can identify regions associated with a legend and regions associated with one or more graphs within the well log image. Once the legend is identified, parameters associated with the at least one graph can be determined from the legend, as illustrated at 312. Such parameters can include a starting domain depth, a range of values associated with the graph, cell dimensions, or a combination thereof. In an example, the identifier engine may utilize optical character recognition to determine alphanumeric characters within the legend.

As illustrated 314, the well trace of the at least one graph can be digitized using parameters determined from the legend. In particular, a trace analysis engine can digitize the contour of the trace by analyzing the at least one graph based on parameters determined from the legend.

Figure 4:
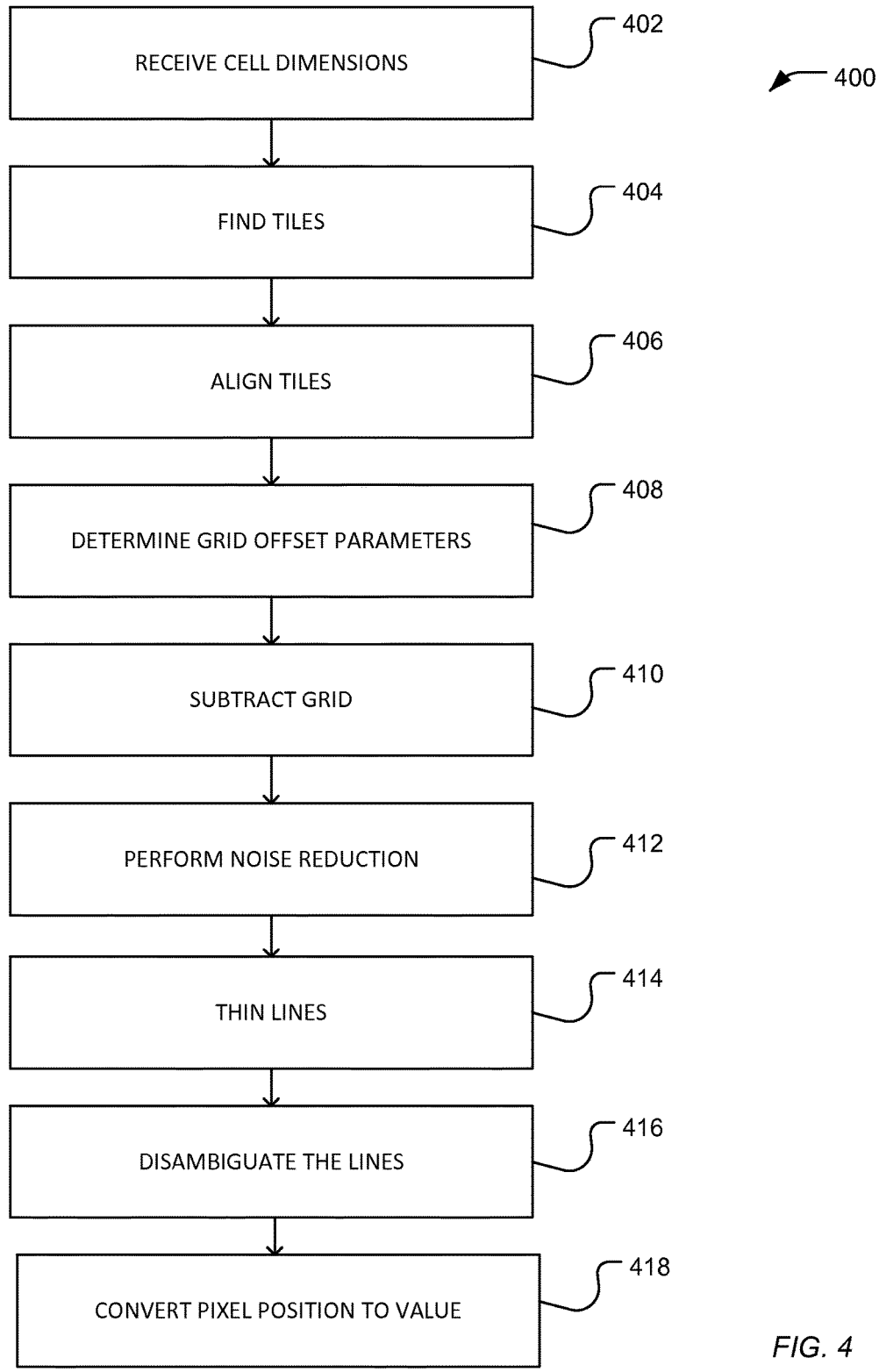

As illustrated in FIG. 4, a method 400 can be used to digitize a well trace of a graph into digital paired data including a range value associated with a domain value. In an example, the trace analysis engine receives cell dimensions, as illustrated at 402. Cell dimensions can be provided by a user. Alternatively, the cell dimensions can be determined from the legend.

A set of tiles are defined along the domain of the graph, as illustrated at 404. In particular, the graph can be divided into subdomains along the domain or depth of the graph. Such subdomains can define a set of successive tiles distributed along the domain of the graph.

As illustrated at 406, each of the tiles can be aligned. In particular, the grid associated with each tile can be determined. For example, using a starting point of the grid cell dimensions, the dimensions of the grid can be adjusted to find a high number of grid lines. In particular, the system can seek a high number of darkened pixels by adjusting cell dimensions including domain length, range height, or pitch of the cells.

Once the grids are determined, the grids can be aligned between adjacent tiles, providing grid offset parameters, as illustrated at 408. In particular, the grid offset parameters can provide vertical or horizontal offset values, pitch, or any combination thereof. The vertical or horizontal offset values can be expressed in pixels, for example.

As illustrated at 410, the grid can be subtracted from the image of the graph resulting in clusters separated by blank spaces partially caused by subtraction of the grid. Optionally, noise reduction can be performed following the subtraction of the grid, as illustrated 412. Alternatively, noise reduction can be performed before or following different steps in the process. For example, noise reduction can be performed prior to substracting the grid.

As illustrated at 414, clusters associated with the contour can be thinned. In particular, line thinning can include decreasing the range values associated with the clusters. For example, the range values can be reduced proportional to the width or thickness of the located gridlines. For example, the range values of each of the clusters can be reduced by moving endpoints at the top and bottom range of the cluster toward a middle pixel of the cluster proportional to a line thickness of the grid. For example, half of a grid line thickness can be removed from the top or bottom of the range of the cluster, providing clusters having high and low range positions closer to a center pixel.

Figure 5:
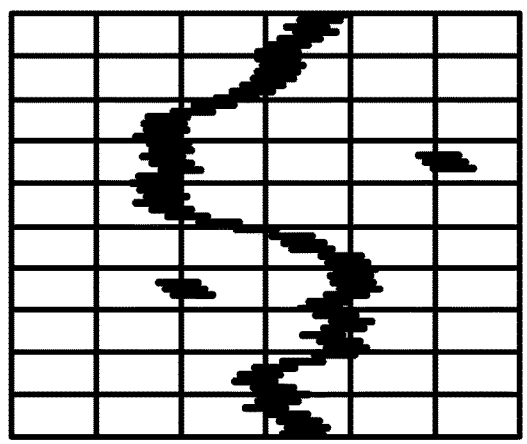
FIG. 5, FIG. 6, FIG. 7, FIG. 8, FIG. 9, FIG. 10, and FIG. 11 include illustrations of exemplary analysis of a well log trace image.
Figure 6:
Figure 7:
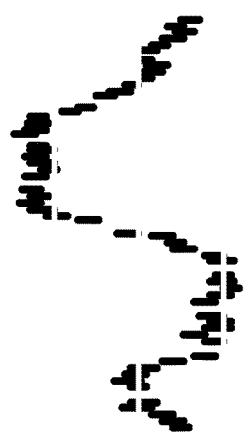

For example, as illustrated in FIG. 5, grid lines within the graph can be located and subtracted to provide clusters, as illustrated in FIG. 6. Following optional noise reduction and line thinning, the clusters can provide a semblance of the contour, as illustrated in FIG. 7.

Figure 8:
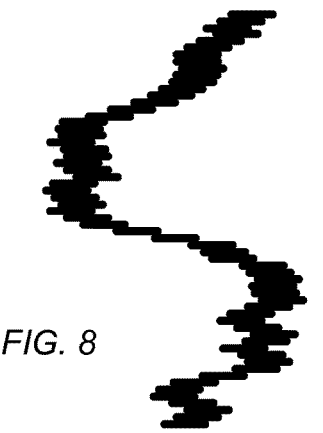
Figure 9:
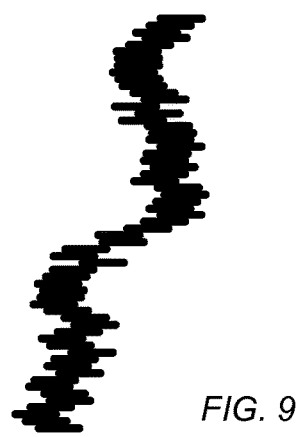
Figure 10:
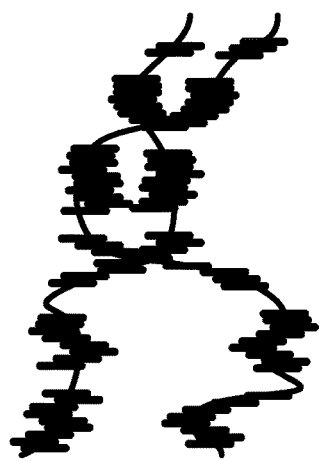
Figure 11:
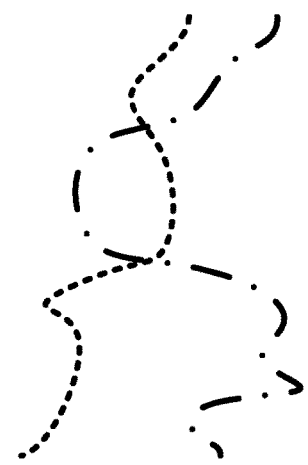

Returning to FIG. 4, as illustrated at 416, the lines can be disambiguated, defining contours by determining connections between clusters thereby defining contours that can be digitized. Such disambiguation is generally difficult in the context of a noisy graph or where more than one line trace is represented on the same graph. For example, two traces as illustrated in FIG. 8 and FIG. 9 may overlap when plotted within a single graph. For example, clusters resulting from the traces of FIG. 8 and FIG. 9 can overlap and be convoluted, as illustrated in FIG. 10, following noise reduction and grid subtraction. As such, the trace analysis engine can determine the number of lines represented in a graph and determine possible connections between clusters to define a most likely contour associated with each line or trace within the graph, as illustrated at FIG. 11.

Figure 12:
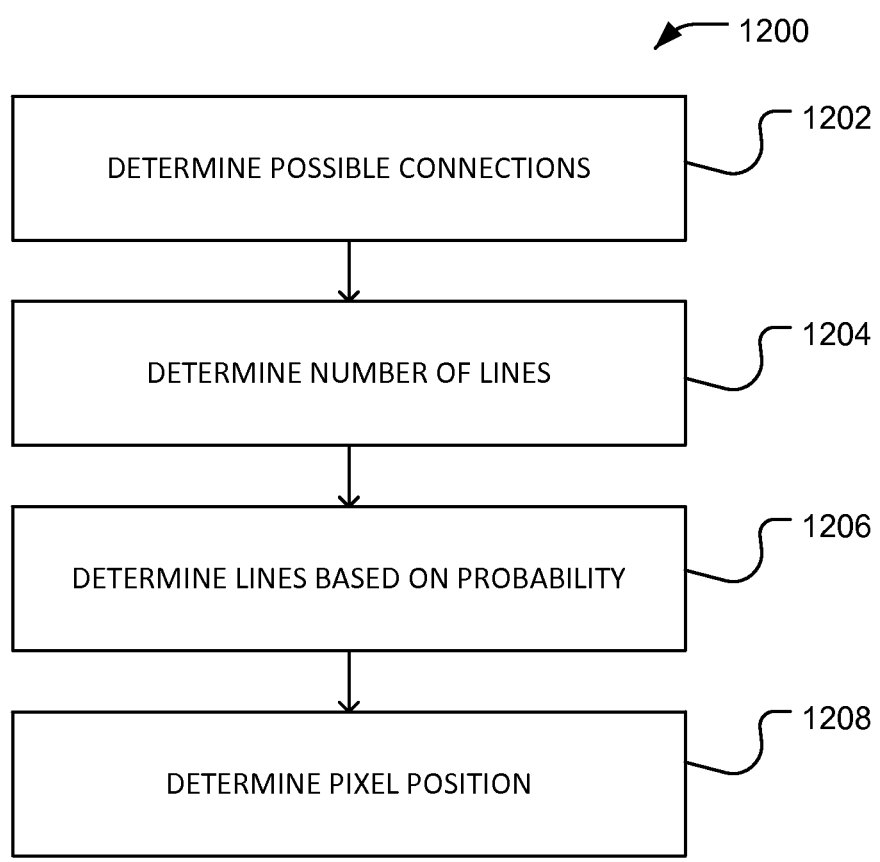
FIG. 12 includes a block flow diagram illustrating an exemplary method for well trace analysis.

As illustrated in FIG. 12, a method 1200 for disambiguating traces within a graph can include determining possible connections between clusters, as illustrated at 1202. In addition, the trace analysis engine can determine a number of traces lines within the graph, as illustrated at 1204. In particular, a connection between two adjacent clusters can be assigned a probability that can be used to determine which clusters belong to which contour or trace, as illustrated at 1206. For example, the probability can be determined based in part on a distance between clusters. Range and domain components of the distance can be weighted differently or can be treated with similar weight. In another example, the direction of the trace associated with previous sets of clusters or subsequent sets of clusters can be used in part to determine a probability for a given possible connection. In a further example, insulator lines can be defined along the upper and lower ranges of each cluster. The probability of a given connection can be influenced in part based on whether a proposed connection crosses an insulator line. As such, contours along such clusters can be defined based on the higher probability connections between clusters. A number of contours or traces can be determined based on the number of high probability paths including connections between clusters.

As illustrated at 1208, the pixel values associated with positions along the domain can be determined based on the contour and interconnected clusters. Returning to FIG. 4, the pixel position can be converted to a value, as illustrated 418. As such, pixel values can be converted to digitize pairs including a range value and a domain value.

With digitized data, the system can further process the data to determine stratigraphic structures, well finishing parameters, well treatment parameters, production models, field models, or any combination thereof. For example, as pattern data is determined, particularly pattern data from more than one well log value trace, a structure analyzer can determine a stratigraphic structure data based on the pattern data. The stratigraphic structured data can include the identification of rock types or rock properties within a stratigraphic structure, or fluid or fluid type within the stratigraphic structure. While the structure analyzer is described separately from pattern recognition, both functions can be performed in a single logical analyzer or the functions can be further subdivided into more than one analyzer.

Depending upon the training of the structure analyzer, the system can project well related parameters. In an example, a well related parameter includes a projection of production of a fluid or gas from the stratigraphic structure. In another example, the well related parameter can include parameters for completing a well, such as suggested treatments or perforations of the well bore within the stratigraphic structure.

Optionally, the system can determine a field model based on the stratigraphic structured data. In particular, well logs of several wells drilled within the same region can be utilized together in conjunction with relative positioning of the wells to determine a field model. Such field models may provide a three-dimensional characterization of the production structure and further facilitate projection of production data or projection of total available production fluid, such as oil or gas.

In a particular example, a first subset of the data can be used to train the engines and a second subset of the data can be used to test the training of the engines. In another example, the data and annotations associated with the data can be split into several subsets. The engines can be trained serially using a subset followed by testing against another subset, followed by additional training with a third subset and testing with a fourth subset of the data. The subsets can be designated by a user. Alternatively, the subsets can be randomly selected for training the engine.

Pattern recognition, the structure analyzer, the identifier engine, or the trace analysis engine can define relationships between the data (e.g., well log images for the identifier engine, graph images for the trace analyzer engine, digitized data for pattern recognition or pattern data for the structure analyzer) and results data (e.g., digitized data for pattern recognition or stratigraphic structure data for the structure analyzer). The relationship can take the form of an algorithm. An exemplary algorithm can take the form of heuristics or the form of algorithms to form regression models, Markov chains, time series models, state space models, Bayesian models, neural networks, or any other appropriate model, or any combination thereof.

In a first aspect, a method of digitizing a well log includes identifying automatically with a computational circuitry a legend and at least one graph of the well log; determining based on a machine learning a parameter of the at least one graph indicated in the legend; and digitizing the at least one graph based on the parameter.

In an example of the first aspect, the method further includes receiving a cell dimension from a user. For example, the cell dimension includes a cell range, a cell domain, or a combination thereof.

In another example of the first aspect and the above example, digitizing includes assigning domain regions to a set of tiles, locating a first grid within a first tile of the set of tiles, locating a second grid within a second tile of the set of tiles adjacent to the first tile, and determining a grid offset parameter to align the first and second grids.

In a further example of the first aspect and the above example, the method further includes identifying a second graph.

In an additional example of the first aspect and the above example, the parameter includes a measurement type, a value range, a domain parameter, or a combination thereof.

In another example of the first aspect and the above example, the method further includes training an identification engine to identify the legend and the at least one graph. For example, the method further includes training the identification engine to determine the parameter from the legend. In another example, the method further includes training a trace digitizing engine to digitize the at least one graph based on the parameter.

In a second aspect, a method of digitizing a well log includes determining a set of possible connections between clusters in a well log image; determining a probability factor of a connection of the set of possible connections; assigning a cluster to a well log trace based on the probability factor; and converting a position of the clusters assigned to the well log trace to a digital value.

In an example of the second aspect, the method further includes identifying tiles within the well log image. For example, the method further includes locating a grid within a tile of the well log image. In another example, the method further includes subtracting the grid from the well log image to produce clusters within the well log image. In an additional example, the method further includes removing noise from the well log image following subtracting the grid.

In another example of the second aspect or the above examples, determining the probability factor includes determined the probability factor at least in part based on a distance between clusters.

In an additional example of the second aspect or the above examples, the range or domain component of the distance is weighted.

In another example of the second aspect or the above examples, determining the probability factor includes determined the probability factor at least in part based on crossing an insulator line defined adjacent to a cluster.

In a further example of the second aspect or the above examples, the method further includes thinning the cluster. For example, thinning the cluster includes reducing the range of the cluster by a value proportional to a grid width.

In a third aspect, an apparatus includes a computational circuitry and a storage medium. The storage medium including well log images and instructions operable by the computation circuitry to perform the method of any one of the above aspects and examples.

In a fourth aspect, an apparatus includes a computational circuitry and a storage medium. The storage medium well log images, an identification engine, a trace digitizing engine, and instructions operable by the computation circuitry to perform the method of any one of the above aspects and examples.

In a fifth aspect, a non-transitory storage medium stores instructions operable by a computational circuitry to implement the method of any one of the above aspects or examples.

As used herein, computational systems can automatically perform functions by performing the functions using instructions operable by processors or computational circuitry. Automatic performance of a function precludes mental activity.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of digitizing a well log, the method comprising:
   identifying automatically with a neural network a legend and at least one graph of the well log;
   applying optical character recognition and an identification engine to the legend to determine parameters of the at least one graph of the well log, the parameters indicated in the legend, the parameters including a starting depth of a domain of the at least one graph of the well log, a range of values represented by the at least one graph of the well log, one or more cell dimensions of a grid shown in the at least one graph, and a testing technique represented in the at least one graph of the well log; and
   digitizing the at least one graph using the parameters to determine values from the at least one graph.

2. The method of claim 1, further comprising receiving a cell dimension from a user.

3. The method of claim 2, wherein the cell dimension includes a cell range, a cell domain, or a combination thereof.

4. The method of claim 1, wherein digitizing includes assigning domain regions to a set of tiles, locating a first grid within a first tile of the set of tiles, locating a second grid within a second tile of the set of tiles adjacent to the first tile, and determining a grid offset parameter to align the first and second grids.

5. The method of claim 4, further comprising subtracting the first and second grids from the graph to produce clusters within the graph.

6. The method of claim 5, further comprising thinning a cluster of the clusters within the graph.

7. The method of claim 6, wherein thinning the cluster includes subtracting a portion from the top or bottom of the range of the cluster.

8. The method of claim 6, further comprising defining a contour between clusters within the graph.

9. The method of claim 8, further comprising determining digital paired values from the contour.

10. The method of claim 8, wherein defining the contour includes determining a set of possible connections between clusters in a well log image and determining a probability factor of a connection of the set of possible connections.

11. The method of claim 10, further comprising assigning a cluster to a contour based on the probability factor.

12. The method of claim 10, wherein determining the probability factor includes determining the probability factor at least in part based on a distance between clusters.

13. The method of claim 10, wherein determining the probability factor includes determining the probability factor at least in part based on crossing an insulator line defined adjacent to a cluster.

14. The method of claim 1, further comprising identifying a second graph.

15. The method of claim 1, wherein the parameter includes a measurement type, a value range, a domain parameter, or a combination thereof.

16. The method of claim 1, further comprising training an identification engine to identify the legend and the at least one graph.

17. The method of claim 16, further comprising training the identification engine to determine the parameter from the legend.

18. The method of claim 16, further comprising training a trace digitizing engine to digitize the at least one graph based on the parameter.

19. An apparatus comprising:
    a computational circuitry; and
    a storage medium comprising:
      well log images;
      an identification engine;
      a trace digitizing engine; and
      instructions operable by the computation circuitry to perform the method comprising:
        identifying automatically with a neural network a legend and at least one graph of the well log;
        applying optical character recognition and an identification engine to the legend to determine parameters of the at least one graph of the well log, the parameters indicated in the legend, the parameters including a starting depth of a domain of the at least one graph of the well log, a range of values represented by the at least one graph of the well log, one or more cell dimensions of a grid shown in the at least one graph, and a testing technique represented in the at least one graph of the well log; and
        digitizing the at least one graph using the parameters to determine values from the at least one graph.

20. A non-transitory storage medium storing instructions operable by a computational circuitry to implement the method comprising:
    identifying automatically with a neural network a legend and at least one graph of the well log;

applying optical character recognition and an identification engine to the legend to determine parameters of the at least one graph of the well log, the parameters indicated in the legend, the parameters including a starting depth of a domain of the at least one graph of the well log, a range of values represented by the at least one graph of the well log, one or more cell dimensions of a grid shown in the at least one graph, and a testing technique represented in the at least one graph of the well log; and digitizing the at least one graph using the parameters to determine values from the at least one graph.

* * * * *